US006796702B2

(12) United States Patent
Wire et al.

(10) Patent No.: US 6,796,702 B2
(45) Date of Patent: Sep. 28, 2004

(54) AUTOMATED SOL-GEL MIXER

(75) Inventors: Richard G. Wire, Bonney Lake, WA (US); Kay Y. Blohowiak, Issaquah, WA (US); Bruce R. Davis, Seattle, WA (US); Steven R. Jones, Sumner, WA (US)

(73) Assignee: The Boeing Company, Chicago, IL (US)

(*) Notice: Subject to any disclaimer, the term of this patent is extended or adjusted under 35 U.S.C. 154(b) by 11 days.

(21) Appl. No.: 10/304,151

(22) Filed: Nov. 26, 2002

(65) Prior Publication Data
US 2004/0099183 A1 May 27, 2004

(51) Int. Cl.⁷ ................................................ B01F 15/02
(52) U.S. Cl. ............................ 366/152.2; 366/155.1; 366/177.1; 366/348
(58) Field of Search .................... 366/152.2, 154.1, 366/155.1, 177.1, 348

(56) References Cited
U.S. PATENT DOCUMENTS 2,574,391 A * 11/1951 Herrly ...................... 366/155.1
3,326,815 A * 6/1967 Werner et al. ............ 366/155.1
3,620,680 A * 11/1971 Bartel et al. ................. 422/138
4,272,824 A * 6/1981 Lewinger et al. ......... 366/152.2
4,310,996 A * 1/1982 Mulvey et al. ............. 52/794.1
4,433,701 A * 2/1984 Cox et al. ................. 366/152.2
4,814,017 A * 3/1989 Yoldas et al. ........... 106/287.12
5,192,130 A * 3/1993 Endo et al. ............... 366/155.1
5,482,368 A * 1/1996 Nakamura et al. ........ 366/152.2
5,782,556 A * 7/1998 Chu ........................ 366/155.1
5,814,137 A    9/1998 Blohowiak et al.
5,935,332 A * 8/1999 Caucal .................... 366/152.2

* cited by examiner

Primary Examiner—Tony G. Soohoo

(57) ABSTRACT

A sol-gel mixer based upon a supply of water or alcohol solvent, a supply of acid, a supply of zirconium alkoxide, and a supply of organosilane, has a series of valves and pumps which provide a first supply of acid and zirconium alkoxide to an agitated pre-mix vessel where the components are allowed to dwell. The solvent and organosilane are then combined with the output from the pre-mix vessel, which is agitated in a final-mix vessel to create a sol-gel. The mixed sol-gel may be aged within the final-mix vessel until ready for use. A series of automated control elements, including valves and pumps, are placed throughout the system to automatically control the volumetric flow of the components through the system in accordance with predetermined parameters.

21 Claims, 5 Drawing Sheets

AUTOMATED SOL-GEL MIXER

FIELD OF THE INVENTION

The invention relates to a method of mixing chemicals to produce a sol-gel for subsequent application to a metal substrate. More particularly, the invention relates to an automated method of mixing raw chemicals to produce a ready to apply sol-gel solution.

BACKGROUND OF THE INVENTION

Various coatings have been developed which promote the adhesion of one or more resinous layers to a titanium, aluminum, or other metallic surface such as that of an airplane component. Some of the coatings improve adhesion by utilizing a sol-gel film between the metal and the resin. The term "sol-gel", a contraction of solution-gelation, refers to a series of reactions where a soluble organometallic species, typically a metal alkoxide or metal salt, hydrolyzes to form a metal hydroxide.

The sol-gel films or sol coatings promote adhesion through a hybrid organometallic coupling agent at the metal surface. The metallic portion of the organometallic, which usually contains zirconium, bonds covalently with the metal. The organic portion of the organometallic bonds covalently with the applied layer of adhesive or matrix resin. In this manner, the organometallic based sol-gel generates a bridging structure that creates a chemical link between the metal surface and the resin primer.

The strength and durability of the sol coating depends upon chemical and micro-mechanical interactions at the surface of the metal involving, for example, the porosity and microstructure of the metal and the tendency of the sol coating to rehydrate. When properly implemented, the sol-gel coatings provide surface stability for paint adhesion, adhesive bonding, or fabrication of structurally superior fiber-metal hybrid laminates.

A sol-gel composition that is particularly useful for coating aluminum and titanium surfaces is based on a combination of organometallic and organosilane components. The preferred organometallic compound for use in a sol-gel for coating aluminum and titanium surfaces is an alkoxy metallic compound, and more preferably an alkoxy zirconium compound. Because of its ready commercial availability, Zr (IV) n-propoxide is particularly preferred as the organometallic compound. In addition to covalently bonding to the metal surface, the organozirconium compound also serves to minimize the diffusion of oxygen to the surface and to stabilize the metal-resin interface. Epoxy-functionalized silanes are the preferred organosilanes because of their stability in solution and their ability to crosslink with common, aerospace epoxy or urethane adhesives. The silane is acid-base neutral, so its presence in the sol mixture does not increase the relative hydrolysis and condensation rates of the alkoxy metallic compounds. Sols including the organosilanes are relatively easy to prepare and to apply with reproducible results.

A particularly useful sol-gel formulation is Boegel-EPII™, developed by The Boeing Company, Seattle, Wash. The Boegel-EPII™ composition is a combination of 3-glycidoxypropyltrimethoxysilane (GTMS) and Zr (IV) n-propoxide which is reacted in the presence of an acetic acid stabilizer. The GTMS has an active epoxy group which can react with common epoxy and urethane resins. GTMS does not form strong Lewis acid-base interactions with the hydrated metal oxide substrate. The zirconium in the mixture tends to react more quickly with the oxide surface of the metal, allowing the desired stratification of the sol-gel film with the epoxy groups of the silane coupling agents oriented toward the resin layer.

To achieve the desired coating structure, it is desired to apply the sol-gel solution to the substrate at the point that the zirconium and silicon are hydrolyzed sufficiently that zirconium and silicon react with the metal surface. If the sol is applied too shortly after beginning the reaction between the organometallic and organosilane, the organosilane may not be fully hydrolyzed upon application. If the sol is not applied soon enough, the hydrolyzed silicon and organometallic components may condense among themselves, forming oligomers and networks.

The need to properly prepare and age the sot-gel before application to a substrate can present a problem because the need for aging causes delays in the coating process. Also, sol-gel that is over-aged must be discarded as waste. Appropriate timing of mixing can increase the efficiency and cost effectiveness of the sol-gel coating process.

It is, therefore, desired to provide a method and apparatus which reacts the components of sol-gel without the need to manually monitor the aging or mixing of the sol-gel. It is further desired to provide an apparatus which supplies sol-gel on demand so that over-aged sol-gel need not be wasted.

SUMMARY OF THE INVENTION

A sol-gel mixer is provided according to embodiments of the present invention which provides a properly mixed and properly aged sot-gel mixture for application to a metallic surface. The sol-gel mixer is automated such that a series of valves, pumps, and tanks control the reaction and mixing of the sol-gel. Flow rates and dwell times are controlled so that aged sol-gel is available from the mixing process such that the sol-gel may be generated on an as-needed basis.

The inputs for the sol-gel mixer comprise a supply of solvent, preferably deionized water, a supply of acid, preferably glacial acetic acid, a supply of zirconium alkoxide, preferably zirconium n-propoxide (TPOZ), and a supply of organosilane, preferably 3-glycidoxypropyltrimethoxysilane (GTMS). A series of controlled valves and pumps first supply the acid and zirconium alkoxide to an agitated pre-mix vessel where the components are allowed to dwell. A supply of solvent is then combined with the output from the pre-mix vessel, which is then combined with a supply of organosilane and solvent in an agitated final-mix vessel. The mixed sol-gel is held for a given induction time and then stored until ready for use. The aged sol-gel is preferably supplied directly from the output of the final-mix vessel.

Each step in the mixing process is automated and is regulated by a controller, preferably a personal computer (PC) or other processing element. Through mechanical interfaces, the controller switches valves and actuates pumps such that precise, predetermined volumetric amounts of acid and zirconium alkoxide are combined and mixed within the pre-mix vessel and so that precise, predetermined amounts of solvent and organosilane are combined with the pre-mixture in the final-mix vessel. Dwell times of the components within the vessels are also automated by the controller.

BRIEF DESCRIPTION OF THE DRAWINGS

Figure 1:
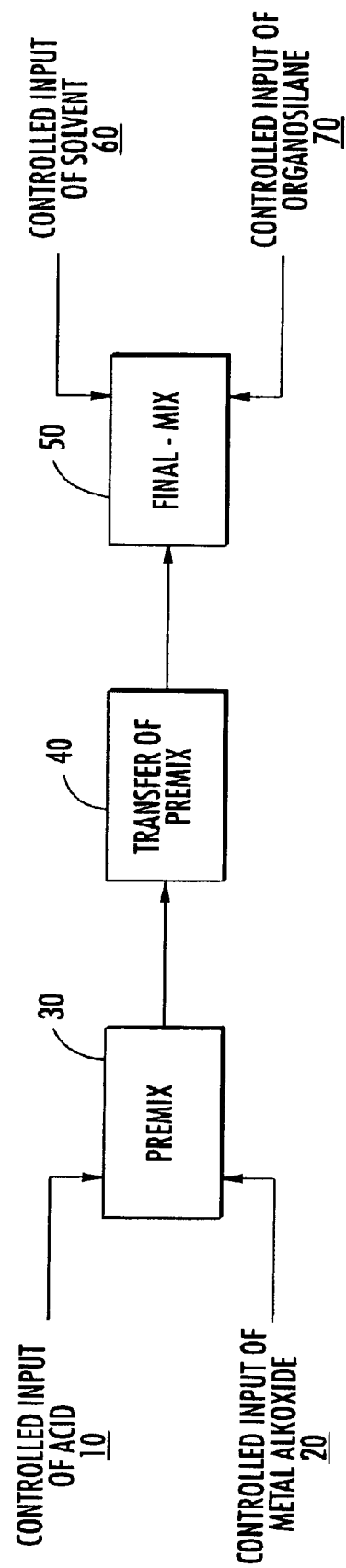
Figure 2:
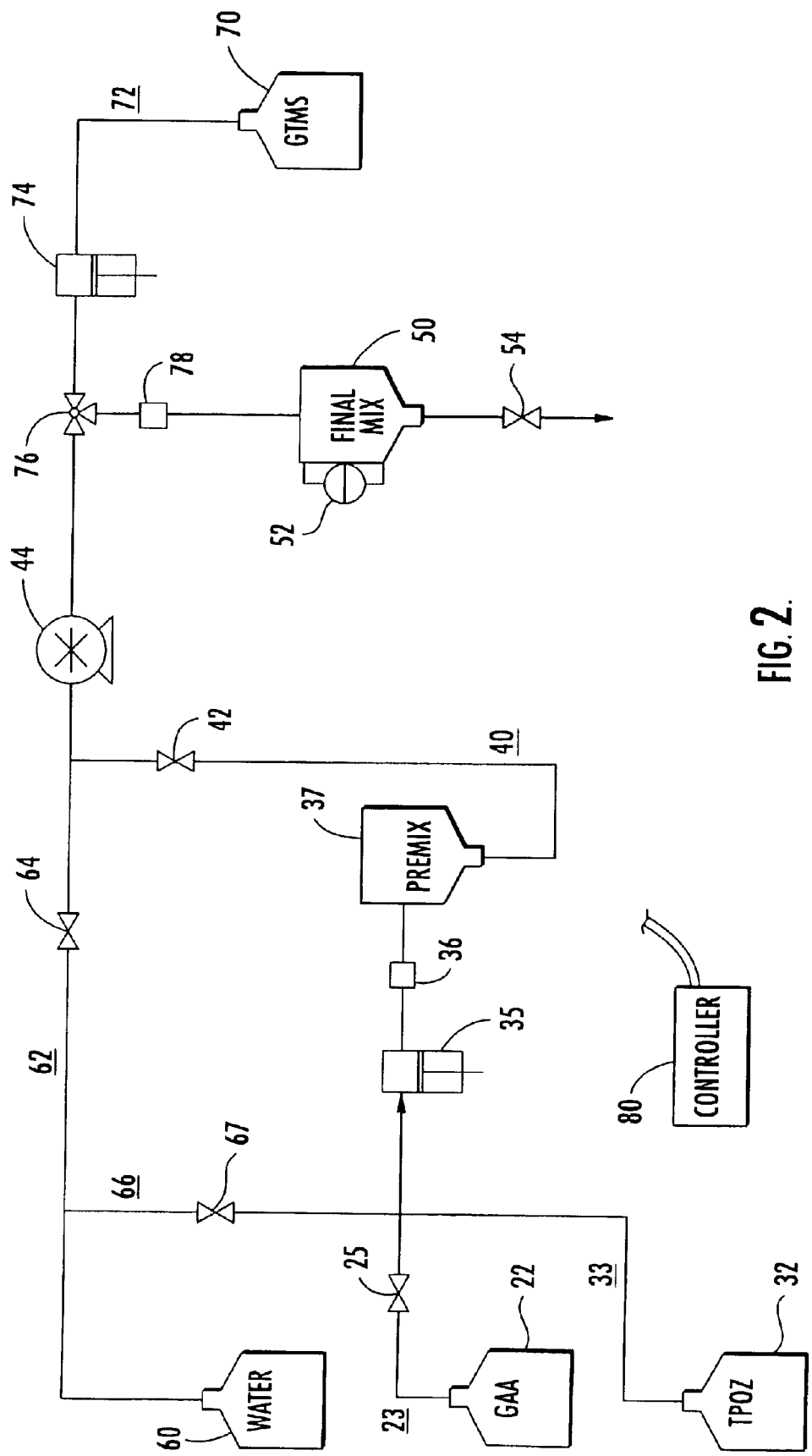
Figure 3:
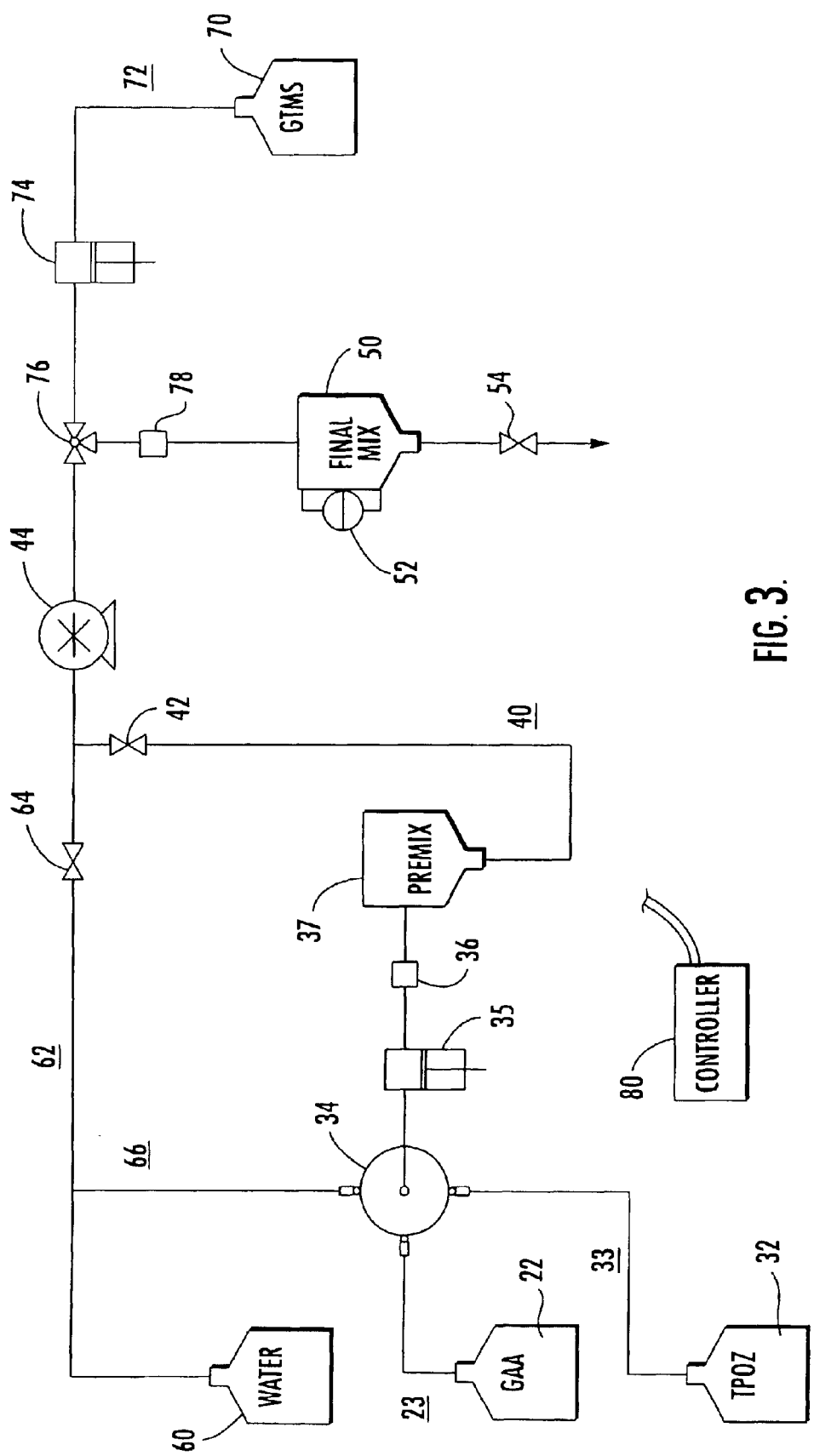
Figure 4:
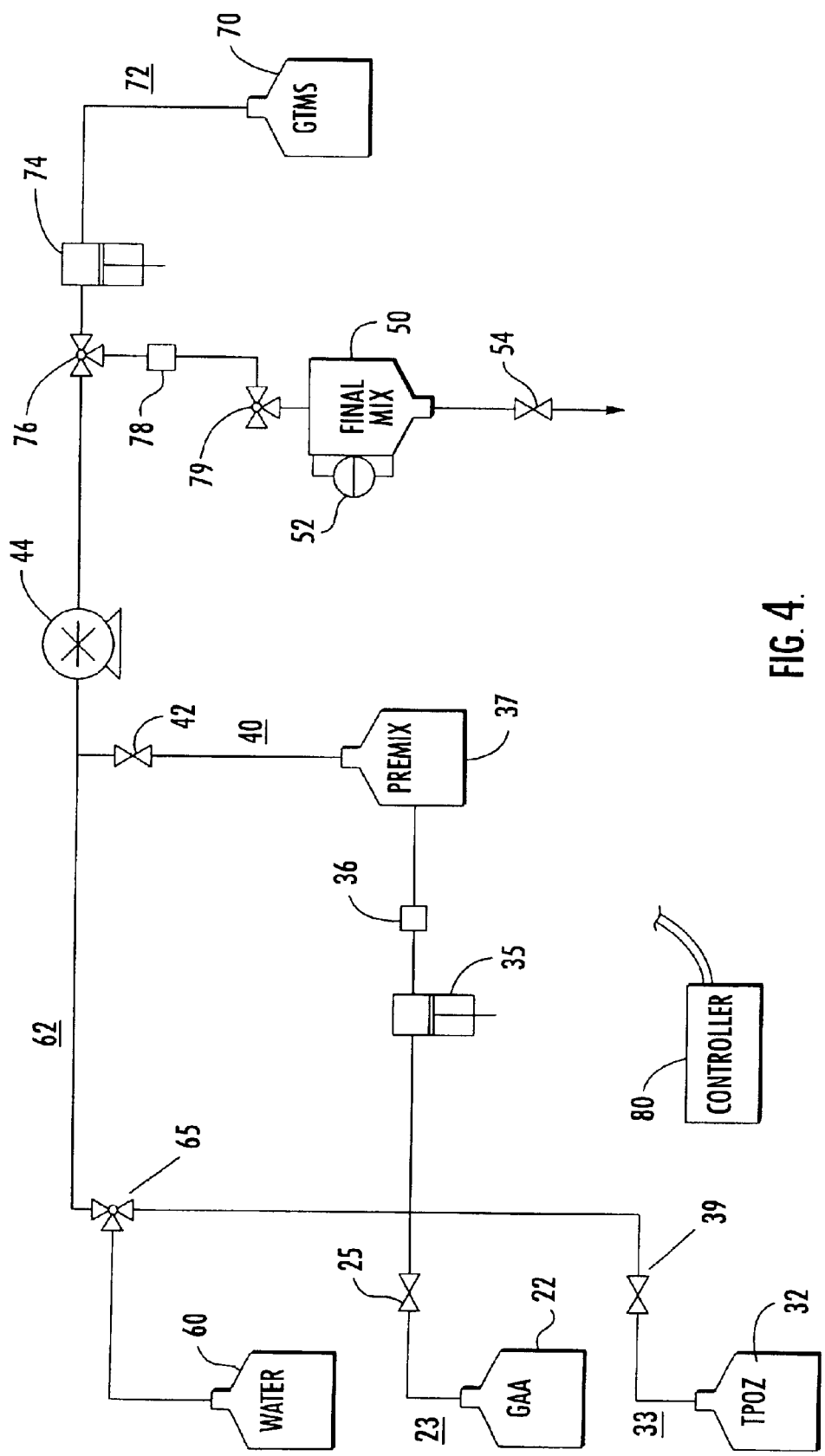
Figure 5:
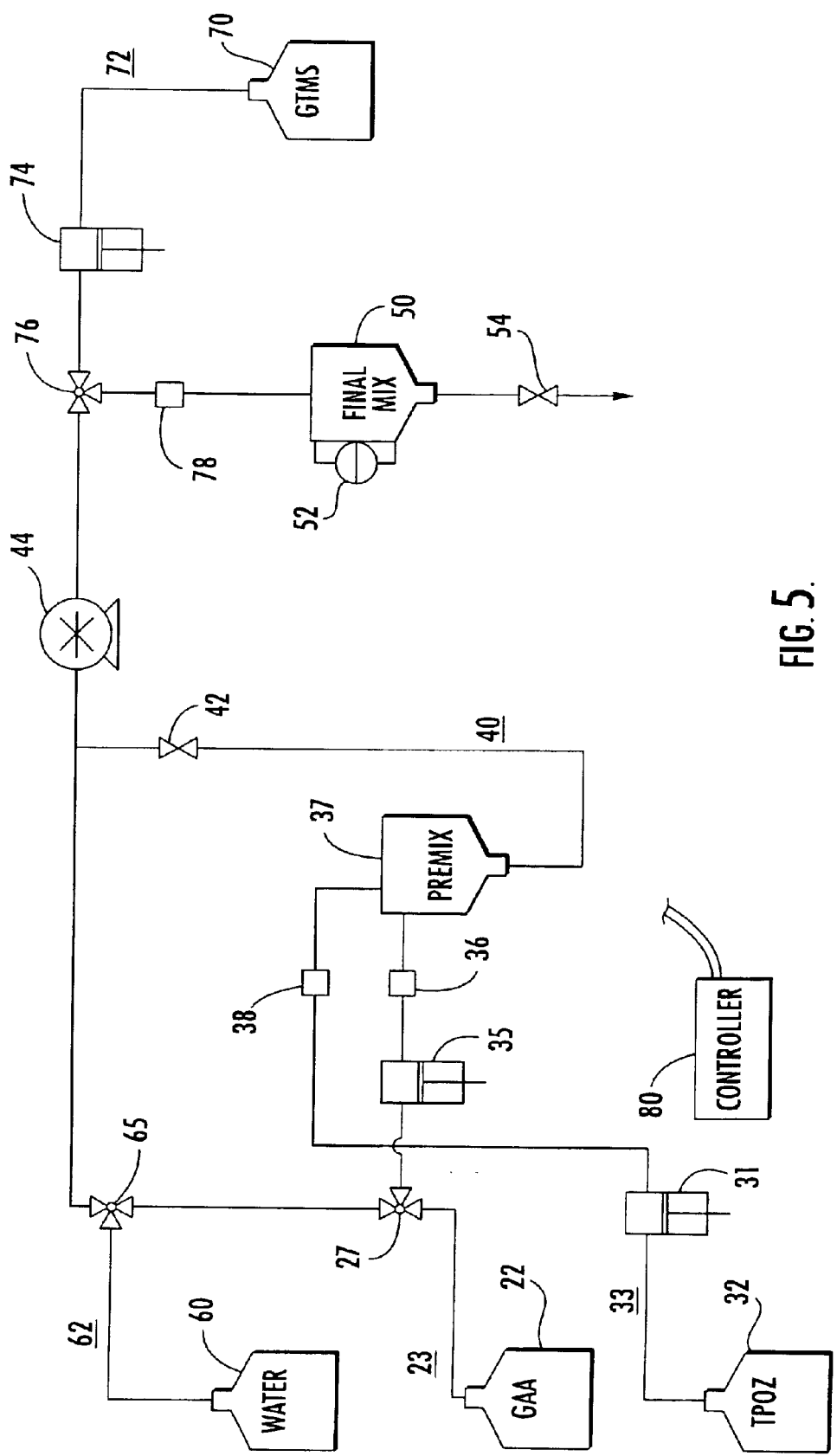

Having thus described the invention in general terms, reference will now be made to the accompanying drawings, which are not necessarily drawn to scale, and wherein:

FIG. 1 is a flow-chart of a general embodiment of the invented mixer;

FIG. 2 is a schematic of a particular embodiment of the invented mixer;

FIG. 3 is a schematic of a second particular embodiment of the invented mixer;

FIG. 4 is a schematic of a third particular embodiment of the invented mixer; and FIG. 5 is a schematic of a fourth particular embodiment of the invented mixer;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, the invented mixer comprises at least four controlled elements in conjunction with at least two mixing vessels. A controlled input of acid 10 and a controlled input of zirconium alkoxide 20 are inputted into a pre-mixing vessel 30. The volume of each of the acid and zirconium alkoxide is controlled such that a predetermined total volume of material is supplied to the pre-mix vessel 30 and such that the acid and zirconium alkoxide are supplied in predetermined volumetric ratios.

The zirconium alkoxide is a compound with the general formula $(R-O)_4Zr$ wherein R is lower linear or branched aliphatic having 2–5 carbon atoms, alicyclic, or aryl, especially normal aliphatic (alkyl) groups. TPOZ, Zr (IV) n-propoxide, available from Aldrich Chemical® in a saturated n-propanol solution, is the preferred zirconium compound.

The acid is provided for the purpose of complexing with the Zr component of the zirconium alkoxide. This stabilization of the zirconium alkoxide allows the zirconium alkoxide to be stable in an aqueous solution and also allows the organosilane component to hydrolyze at approximately the same rate. The minimum amount of acid necessary to form the zirconium-acid complex is used to prevent excess acid from evaporating or being trapped in the deposited coating. Glacial acetic acid is the preferred acid, though other organic acids, like citric acid, can be substituted for the acetic acid. Glycols, ethoxyethanol, $H_2N-CH_2-CH_2-OH$, or the like may also be used as the acid.

When using glacial acetic acid and TPOZ as the acid and zirconium alkoxide, the acid is supplied to the pre-mixture vessel 30 in the amount of about 0.5% to about 2.0% by volume of the total mixture. In general, the acid component of the mixture is supplied in volumes which result in a molar ratio of about 4:1 to about 5:1 (acid: zirconium alkoxide).

The acid and zirconium alkoxide may be added to the pre-mix vessel 30 sequentially or concurrently. The components may be separately introduced to the pre-mix vessel 30 or may be combined just prior to entering the pre-mix vessel 30. Also, addition of acid and zirconium alkoxide to the pre-mixer may be continuous or non-continuous. The components will be mixed within the pre-mix vessel 30 for a predetermined dwell time. In the case of a continuous process, the dwell time will be the average residence time of the components within the pre-mix vessel 30. For non-continuous or batch operations, the dwell time will be the actual time that both components are present within the vessel 30.

The pre-mix vessel 30 incorporates a continuous agitation means for agitating the pre-mix. Agitation may be accomplished with one or more impellers within the vessel, with one or more stir bars within the vessel, by a continuous fluid recycle loop within the vessel, by agitating the vessel and its contents through vibration, and other similarly known methods. Agitation provides intimate mixture of the pre-mixture components and prevents the zirconium alkoxide from solidifying out of solution. The pre-mix vessel 30 is of a size to provide predetermined residence time for the mixed components within the vessel, preferably about 10 to 20 minutes.

After the acid and zirconium alkoxide have dwelled in the pre-mix vessel 30 for a predetermined amount of time, a volume of the pre-mix 40 is transferred from the pre-mix vessel 30 to a final-mix vessel 50. If the mixer is used in a continuous process, it is preferred that the volume transferred from the pre-mix vessel to the final-mix vessel also be controlled. In batch operation, the entire volume of the pre-mix vessel is transferred to the final-mix vessel and does not need to be otherwise controlled. A controlled amount of solvent 60 and controlled amount of organosilane 70 are also added to the final-mix vessel 50. Each of the pre-mix 40, solvent 60, and organosilane 70 may be added concurrently or sequentially with respect to one another, but the components are preferably added to the final-mix vessel 50 either concurrently or in rapid succession.

The preferred organosilane is 3-glycidoxypropyltrimethoxysilane (GTMS). GTMS is preferred for several reasons. First, the GTMS includes an active epoxy group which reacts favorably with bond primers. Second, the GTMS does not form strong Lewis acid-base interactions with hydrated oxide substrates to which it is applied. Other organosilanes that may be used in accordance with the invention are 3-aminopropyltriethoxysilane, p-aminophenylsilane, m-aminophenylsilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-glycidoxypropyltrinethoxysilane, 3-glycidoxypropyltriethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, or vinyltrimethoxysilane.

The solvent of the solvent supply 60 is preferably water, and is more preferably deionized water (DI). Alcohol may be substituted, partially or completely, for the water used in formation of the sol-gel.

Sol-gel is created by stirring the components within the final-mix vessel 50 as required but for a minimum of 10 minutes, to allow for proper dispersion of the solids within the aqueous mixture. As with the pre-mix vessel 30, the final-mix vessel 50 incorporates a continuous agitation means for agitating the mixture. Agitation may be accomplished with one or more impellers within the vessel, by stir bars in the vessel, by a continuous fluid recycle loop within the vessel, by agitating the vessel and its contents through vibration, and other similarly known methods. The resulting sol-gel mixture may be discharged from the final-mix vessel automatically or manually on demand.

In a preferred final resulting sol-gel mixture, the GTMS and Zr (IV) n-propoxide are preferably present in a molar ratio between about 2:1 and about 5:1, and most preferably about 5:1. The solids (GTMS and Zr (IV) n-propoxide) comprise about 5% and water comprises about 95%, by mass percentage.

The invention may be embodied in many different conformations. Several are shown below. Since TPOZ is the preferred zirconium alkoxide, GTMS is the preferred organosilane, and water is the preferred solvent, these exemplary compounds are used throughout for convenience, though it is recognized that the embodiments and the teachings as a whole are applicable to a wide range of zirconium alkoxides, organosilanes, and solvents as specified herein. The concentrations of the pre-mixture and the resulting sol-gel may be varied depending upon the particular components used in production of the sol-gel, and depending on the manner in which the resulting sol-gel will be used.

Each step in the mixing process is automated and is regulated by a controller 80. Through mechanical interfaces, the controller switches valves and actuates pumps such that precise, predetermined volumetric amounts of acid and zirconium alkoxide are combined and mixed within the pre-mix vessel and so that precise, predetermined amounts of solvent and organosilane are combined with the pre-mixture in the final-mix vessel. Dwell times of the components within the vessels are also automated by the controller 80.

Referring to FIG. 2, one embodiment of the mixer is presented in which a supply of acid 22 and zirconium n-propoxide (TPOZ) 32 are provided. The acid and TPOZ are transferred to a pre-mix vessel 37 via respective acid and TPOZ supply lines 23, 33. Each of the supply lines 23, 33 are in line with a controlled volumetric metering pump 35 which may be used to adjust or cease the combined flow of the acid and TPOZ to the pre-mix vessel 37. A controlled valve 25 in-line with the acid supply line 23 controls the ratio of acid to TPOZ pumped by pump 35.

The combined acid/and TPOZ are mixed within the pre-mix vessel 37 for a predetermined amount of time and then pumped by metering pump 44, through a pre-mix transfer line 40 and controlled valve 42 to the final-mix vessel 50. In non-continuous operation, a standard pump 44 may advantageously be used rather than a metering pump to transfer the pre-mix because the volume present within the pre-mix tank 37 will already be known and the total contents of the pre-mix tank may simply be transferred to the final-mix tank 50.

A GTMS supply 70 is in communication with the final-mix vessel 50, such that the GTMS is supplied from the GTMS supply 70 through a GTMS supply line 72 to the final-mix vessel 50. The GTMS is pumped by a controlled volumetric metering pump 74 in-line with the supply line 72.

A water supply 60 is in communication with the final-mix vessel 50, such that the water is supplied from the water supply 60 via water supply line 62 through water feed valve 64 to the final-mix vessel 50. The water is pumped by metering or standard controlled pump 44.

To provide for rinsing the mixing system, the mixer is arranged such that water from the water supply 60 may be pumped through rinse line 66 and rinse valve 67, through the pre-mix pump 35 and pre-mix vessel 37 in order to rinse the pumps, lines, and vessels after a batch of sol-gel has been mixed. If water is used to rinse the system, acid 22 is preferably cycled through the pre-mix pump 35 and vessel 37 prior to mixing a fresh batch of sot-gel, so that water in the pump 35 and vessel 37 does not react unfavorably with the TPOZ 32.

The position of all valves 25,42, 64, 67, and the operation of all pumps 35, 44, 74 within the mixer are controlled by an automated control unit 80 which positions the valves and operates the pumps at predetermined times.

A number of additional devices may optionally be used in operation of the mixer. For instance, a three-way valve 76 in-line between the pumps 44, 74 and the final-mix vessel 50 may be used, if necessary, to prevent backflow of materials through one pump due to increased pressure generated by an opposing pump.

Also, flow meters such as bubble detectors 36, 38, 78 may be used in-line with the transfer lines of the mixer to indicate the presence of solution within the lines. A flow detector 36, 38 positioned between the supply of components 22, 32 and the pre-mix vessel 37, may be used to indicate when a supply is inadequate. A flow detector 78 between the pre-mix tank 40 and final-mix tank 50 may be used to indicate when all material has been transferred from the pre-mix tank 37 to the final-mix tank 50 during batch operation. In addition, level indicators 52 may be used to indicate the presence of fluid within the respective vessels.

Referring to FIG. 3, in a second embodiment of the mixer a controlled multi-position valve 34 is used in place of supply valves 25 and 67. The multi-position valve 34 allows a controlled flow of single supply components or any mixture of TPOZ, acid, and water.

Referring to FIG. 4, a third embodiment of the invention is substantially similar to the first embodiment of the invention. However, water supply valve 64 and rinse line valve 67 are replaced by a single controlled three way valve 65 which controls the flow of water to the final-mix vessel 50 or through the rinse cycle of the mixer. In addition, a controlled TPOZ supply valve 39 is added for versatility in controlling the supply of TPOZ to the pre-mix vessel 37. An additional three way valve 79 may be positioned near the inlet of the final-mix vessel 50 to aid in bleeding the final-mix vessel.

Referring to FIG. 5, a fourth embodiment of the invention is shown in which a metering pump 31 and bubble detector 38 are added in-line with the TPOZ supply 32. This configuration completely separates the TPOZ supply from the acid supply 22 so that the TPOZ may be separately pumped and monitored. Flow of acid or solvent is still provided through metering pump 35 and controlled by a three way valve 27.

In each of the above embodiments, the pumps and valves are connected to a controller 80 such as an automated control element. The control element may be centralized or distributed. Typical control elements include a microprocessor, preferably a personal computer (PC) or microcontroller, but may be other types of computing devices and/or processing elements capable of receiving data concerning predetermined mix ratios and dwell times and appropriately adjusting the positions of the valves and the operation of pumps may be utilized. The controller may also control the operation of the agitation means within the pre-mix and/or final-mix vessels. The controller is preferably in communication with each of the controlled elements of the mixer. The controller may communicate with the various elements via wired communication, radio communication, or any other type of communication commonly used in control engineering.

Use of the invented mixer allows accurate and automated mixing and aging of a sol-gel. Aging of the sol, also termed induction time, is an important factor in use of the sols. Complete hydrolysis and condensation of the organometallic in the sol-gel film is important to develop a hydrolytically stable metal oxide film in the metal. The presence of hydrolyzable alkoxides in the sol-gel film will have two adverse effects. Every residual alkoxide represents an incomplete condensation site between the metal and the coupling agents. Incomplete condensation, therefore, decreases the ultimate bond strength of the sol-gel film.

Aging is a function of the rates of the hydrolysis reaction of the TPOZ and the organosilane. The TPOZ hydrolizes more rapidly than the silane. The zirconate hydrolyzes rapidly using ambient moisture and condenses with itself or with absorbed water on a titanium surface. If not properly controlled, this zirconate hydrolysis self-condensation reaction can produce insoluble zirconium oxyhydroxides which will precipitate and become nonreactive.

If the sol is applied too short a time after being made, the organosilane may not be fully hydrolyzed. As the sol ages, the hydrolyzed silicon and zirconium components may condense among themselves, forming oligomers and networks. These networks will eventually become visible to the naked eye and become insoluble. The ideal solution age is at the point that the zirconium and silicon are hydrolyzed sufficiently that zirconium and silicon react with the metal surface. Proper aging times for sol-gels of various compositions are known from empirical data. At this point, generally some metal polymers and networks have formed in the sol and they will give the sol-gel film some structure.

In order to take advantage of the full scope of the favorable adhesive properties provided by the invented sol-gel, the metal surface must be properly prepared and the sol-gel must be properly applied. Techniques for applying a sol-gel that are equally applicable to the invented adhesion-promoting sol-gel coating are found in Blohowiak et al., U.S. Pat. No. 5,814,137, and are incorporated herein by reference.

Sol coated metals are useful in hybrid laminates like those described in U.S. Pat. Nos. 4,489,123 and 5,866,272. These hybrid laminates are candidates for use as aircraft skin panels and other structural applications in subsonic or, especially, supersonic aircraft. The utility of these hybrid laminates hinges on a sound, strong adhesive bond between the metal and resin. By preparing the sol with the invented mixer, the sol coating provides a consistent, high strength adhesion interface at relatively low cost. Because the mixer is automated, a well mixed sol-gel is supplied in a highly efficient manner, at a lower cost, and on a more consistent basis than manually mixed sol-gels.

The invented automated sol-gel mixer provides a uniform, well-mixed, sol-gel for use in coating metal substrates. The mixer is preferably operated with a control system which continually monitors and controls the mixer so as to provide a consistent sol-gel mixture on demand. The mixer provides a sol-gel that is properly mixed and properly aged.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An automated sol-gel mixer comprising
   a supply of solvent selected from the group consisting of water, alcohol, and mixtures thereof;
   a supply of acid;
   a supply of zirconium alkoxide;
   a supply of organosilane;
   a pre-mix vessel in controlled communication with the supply of acid and supply of zirconium alkoxide such that the pre-mix vessel receives a predetermined volumetric ratio of acid and zirconium alkoxides;
   a final-mix vessel in controlled communication with the pre-mix vessel, the organosilane supply, and the solvent supply such that the final-mix vessel receives a predetermined volumetric ratio of pre-mix, organosilane, and solvent; and
   at least one automated controller for controlling volumetric flows into and out of the pre-mix vessel, as well as controlling volumetric flows into the final-mix vessel.

2. The mixer of claim 1, wherein the zirconium alkoxide is zirconium n-propoxide (TPOZ).

3. The mixer of claim 1, further comprising valves in-line with each of the solvent, acid, zirconium alkoxide, and organosilane supplies, wherein the controller is in operative communication with the valves.

4. The mixer of claim 1, further comprising at least one supply pump in-line between the pre-mix vessel and at least one of the acid supply and zirconium alkoxides supply, wherein the controller is in operative communication with the supply pump.

5. The mixer of claim 4, wherein the acid supply, and zirconium alkoxide supply are combined in the pre-mix vessel.

6. The mixer of claim 1, further comprising at least one pre-mix pump in-line between the final-mix vessel and the pre-mix vessel, and the controller is in operative communication with the pre-mix pump.

7. The mixer of claim 6, wherein at least one organosilane pump is in-line between the organosilane supply and the final-mix vessel, and the controller is in operative communication with the organosilane pump.

8. The mixer of claim 1, wherein the acid is selected from the group consisting of acetic acid, citric acid, glycols, ethoxyethanol, and $H_2NCH_2CH_2OH$.

9. The mixer of claim 1, wherein the organosilane is selected from the group consisting of 3-aminopropyltriethoxysilane, p-aminophenylsilane, m-aminophenylsilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-glycidoxypropyltrimethoxysilane, 3-glycidoxypropyltriethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, and vinyl-trimethoxysilane.

10. The mixer of claim 9, wherein the organosilane is 3-glycidoxypropyl (GTMS).

11. The mixer of claim 1, further comprising a flow sensor in-line between the zirconium alkoxide supply and the pre-mix vessel, wherein the controller is in operative communication with the flow sensor.

12. The mixer of claim 1, further comprising a flow sensor in-line between the pre-mix vessel and the final-mix vessel, wherein the controller is in operative communication with the flow sensor.

13. The mixer of claim 1, further comprising a flow sensor in-line between the organosilane supply and the final-mix vessel, wherein the controller is in operative communication with the flow sensor.

14. The mixer of claim 1, wherein the pre-mix vessel further comprises an agitator.

15. The mixer of claim 1, wherein the final-mix vessel further comprises an agitator.

16. A method of mixing sol-gel comprising
supplying of solvent selected from the group consisting of water, alcohol, and mixtures thereof;
supplying an acid;
supplying a zirconium alkoxide;
supplying an organosilane;
combining a volume of acid and a volume of zirconium alkoxides;
mixing the combined acid and zirconium alkoxides in a pre-mix vessel;
combining the mixture from the pre-mix vessel with the solvent and with the organosilane; and
mixing the combined acid, zirconium alkoxides, solvent, and organosilane within a final-mix vessel to form a sol-gel,
wherein the steps of combining and mixing are each automated and are collectively controlled by a control unit.

17. The method of claim 16, wherein supplying the zirconium alkoxides comprises supplying zirconium n-propoxide (TPOZ).

18. The method of claim 16, wherein supplying the organosilane comprises supplying organosilane that is selected from the group consisting of 3-aminopropyltriethoxysilane, p-aminophenylsilane, m-aminophenylsilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-glycidoxypropyltrimethoxysilane, 3-glycidoxypropyltriethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, and vinyl-trimethoxysilane.

19. The method of claim 18, wherein supplying the organosilane comprises suppying 3-glycidoxypropyl (GTMS).

20. The method of claim 16, further comprising the step of holding the acid and zirconium alkoxides in the pre-mix vessel for a predetermined dwell time prior to combining the mixture from the pre-mix vessel with the solvent and the organosilane.

21. A system for the automated mixing of sol-gel comprising
a valved stream of solvent selected from the group consisting of water, alcohol, and mixtures thereof;
a valved stream of acid catalyst;
a valved stream of zirconium n-propoxide (TPOZ);
a valved stream of organosilane;
a pre-mix vessel in communication with the acid stream and the TPOZ stream;
a final-mix vessel in communication with the solvent stream, the pre-mix vessel, and the organosilane stream; and
at least one automatic control element operatively connected in-line with the pre-mix vessel and final-mix vessel for controlling volumetric inputs and outputs of the vessels.

* * * * *